(12) United States Patent
Chen et al.

(10) Patent No.: US 9,966,852 B1
(45) Date of Patent: May 8, 2018

(54) DUAL VOLTAGE OUTPUT DEVICE AND CHARGING CIRCUIT THEREOF

(71) Applicant: ANPEC ELECTRONICS CORPORATION, Hsinchu (TW)

(72) Inventors: Fu-Chuan Chen, Hsinchu (TW); Chih-Yuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days. days.

(21) Appl. No.: 15/475,949

(22) Filed: Mar. 31, 2017

(30) Foreign Application Priority Data

Jan. 11, 2017 (TW) .............................. 106100855 A

(51) Int. Cl.
  *H02M 3/158* (2006.01)
  *H02J 7/00* (2006.01)

(52) U.S. Cl.
  CPC ......... *H02M 3/1582* (2013.01); *H02J 7/0052* (2013.01); *H02M 3/158* (2013.01); *H02M 3/1588* (2013.01)

(58) Field of Classification Search
  CPC ..................................................... H02M 3/158
  See application file for complete search history.

(56) References Cited

U.S. PATENT DOCUMENTS

| | | | | |
|---|---|---|---|---|
| 2012/0112724 | A1* | 5/2012 | Nishida | H02M 3/07 323/293 |
| 2015/0222235 | A1* | 8/2015 | Swanson | H02M 3/158 381/120 |

* cited by examiner

*Primary Examiner* — Jue Zhang
*Assistant Examiner* — Trinh Q Dang
(74) *Attorney, Agent, or Firm* — Li & Cai Intellectual Property (USA) Office

(57) ABSTRACT

A dual voltage output device includes a charging circuit and a control circuit. The charging circuit includes a first switch, a second switch, a third switch, a fourth switch, a fifth switch, a sixth switch, an inductor, a first capacitor and a second capacitor. The control circuit controls the first switch, the second switch, the third switch, the fourth switch, the fifth switch and the sixth switch so that a DC voltage source charges the inductor and the inductor charges the first capacitor and the second capacitor individually or together. Therefore, the capacitor provides a first voltage, and the second capacitor provides a second voltage.

9 Claims, 5 Drawing Sheets

DUAL VOLTAGE OUTPUT DEVICE AND CHARGING CIRCUIT THEREOF

BACKGROUND OF THE INVENTION

1. Field of the Invention

The present invention relates to a voltage output device, more particularly to a dual voltage output device.

2. Description of Related Art

One limitation in conventional boost and buck converter circuits is that the switch components must withstand high voltage stress, which equals to the sum of input and output voltages. Therefore, elements with high voltage tolerant level and large surface area are required to manufacture these switch components. This results in high cost of the switches in conventional boost and buck converter circuits. In this regard, there is still room for improvement in conventional boost and buck converter circuits.

SUMMARY OF THE INVENTION

The object of the present disclosure is to provide a modified boost-buck converter circuit designed to achieve a performance comparable to conventional boost and buck converter circuits without using high cost elements having high voltage tolerant level.

The present disclosure discloses a charging circuit, including a first switch, an inductor, a second switch, a third switch, a first capacitor, a fourth switch, a fifth switch, a sixth switch and a second capacitor. The first switch has a first terminal coupled with a DC (direct current) voltage source. The inductor has a first terminal coupled with a second terminal of the first switch. The second switch has a first terminal coupled with a second terminal of the inductor, and a second terminal coupled to the ground. The third switch has a first terminal coupled with the second terminal of the inductor. The first capacitor provides a first voltage, and has a first terminal coupled with a second terminal of the third switch, and a second terminal coupled to the ground. The fourth switch has a first terminal coupled with the second terminal of the first switch. The fifth switch has a first terminal coupled with a second terminal of the fourth switch, and a second terminal coupled to the ground. The sixth switch has a first terminal coupled with the second terminal of the fourth switch. The second capacitor provides a second voltage, and has a first terminal coupled with a second terminal of the sixth switch, and a second terminal coupled to the ground.

The present disclosure discloses a dual voltage output device that includes a charging circuit. The charging circuit includes a first switch, an inductor, a second switch, a third switch, a first capacitor, a fourth switch, a fifth switch, a sixth switch, a second capacitor and a control circuit. The first switch has a first terminal coupled with a DC voltage source. The inductor has a first terminal coupled with a second terminal of the first switch. The second switch has a first terminal coupled with a second terminal of the inductor, and a second terminal coupled to the ground. The third switch has a first terminal coupled with the second terminal of the inductor. The first capacitor provides a first voltage, and has a first terminal coupled with a second terminal of the third switch, and a second terminal coupled to the ground. The fourth switch has a first terminal coupled with the second terminal of the first switch. The fifth switch has a first terminal coupled with a second terminal of the fourth switch, and a second terminal coupled to the ground. The sixth switch has a first terminal coupled with the second terminal of the fourth switch. The second capacitor provides a second voltage, and has a first terminal coupled with a second terminal of the sixth switch, and a second terminal coupled to the ground. The control circuit is coupled with the charging circuit for controlling the first switch, second switch, third switch, fourth switch, fifth switch and sixth switch.

The dual voltage output device in the present disclosure charges the inductor using the DC voltage source, and the bilateral terminals of the inductor charge a first capacitor and a second capacitor respectively. Therefore, the first and second capacitors provide a positive voltage and a negative voltage to other load circuits respectively.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

It should be noted that despite the present disclosure uses terms such as "first", "second", "third" and so forth to distinguish one element or signal from another, the elements and signals in the present disclosure are not limited by these terms. In addition, the term "or" in the present disclosure may include not only any of the listed items but also any combinations thereof, depends on the context.

Figure 1:
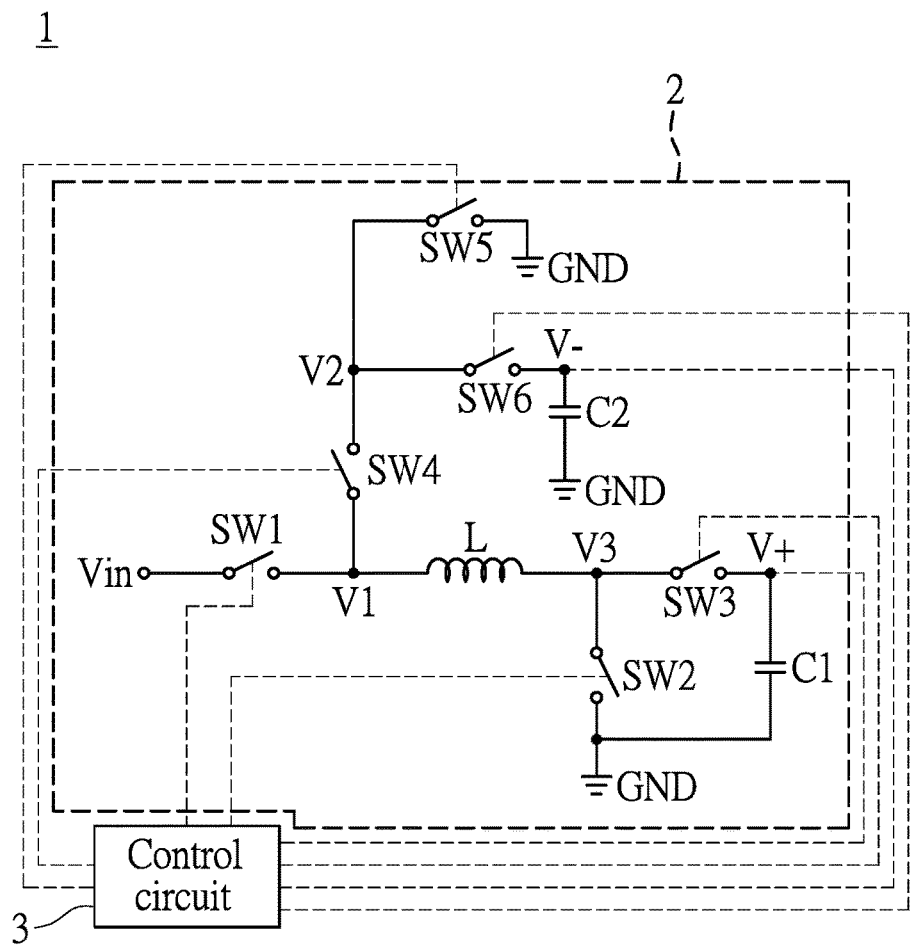
FIG. 1 shows a schematic diagram of a dual voltage output device according to the present disclosure.
Figure 2:
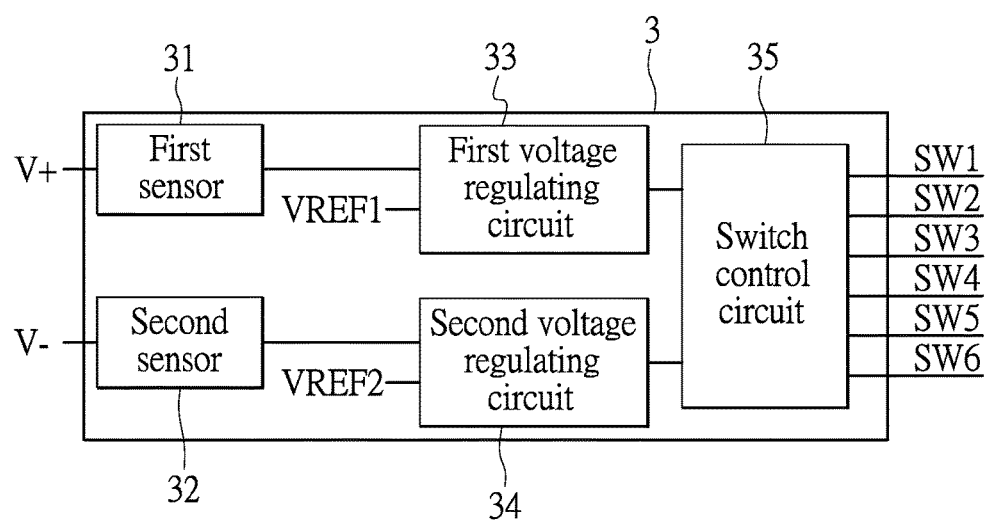
FIG. 2 shows a circuit diagram of a control circuit according to the present disclosure.

Referring to FIG. 1, which shows a schematic diagram of a dual voltage output device according to the present disclosure, the dual voltage output device 1 includes a charging circuit 2 and a control circuit 3. The charging circuit 2 includes a first switch SW1, a second switch SW2, a third switch SW3, a fourth switch SW4, a fifth switch SW5, a sixth switch SW6, an inductor L, a first capacitor C1 and a second capacitor C2. The first switch SW1 has a first terminal coupled with a DC voltage source VIN. The inductor L has a first terminal coupled with a second terminal of the first switch SW1. The second switch SW2 has a first terminal coupled with a second terminal of the inductor L, and a second terminal coupled to the ground GND. The third switch SW3 has a first terminal coupled with the second terminal of the inductor L. The fourth switch SW4 has a first terminal coupled with the second terminal of the first switch SW1. The fifth switch SW5 has a first terminal coupled with a second terminal of the fourth switch SW4, and a second terminal coupled to the ground GND. The sixth switch SW6 has a first terminal coupled with the second terminal of the fourth switch SW4. The first capacitor C1 provides a first voltage V+ (positive voltage) to a first load circuit, and has a first terminal coupled with a second terminal of the third switch SW3, and a second terminal coupled to the ground GND. The second capacitor C2 provides a second voltage V− (negative voltage) to a second load circuit, and has a first terminal coupled with a second terminal of the sixth switch SW6, and a second terminal coupled to the ground GND. In particular, the first switch SW1, the second switch SW2, the third switch SW3, the fourth switch SW4, the fifth switch SW5 and the sixth switch SW6 are analog switches, preferably being transistors, but the present disclosure is not limited thereto. In addition, the first load circuit and second load circuit can be, but are not limited to, the same load circuit or different load circuits. Furthermore, as shown in FIG. 2, the control circuit 3 is coupled with the charging circuit 2, and includes a first sensor 31, a second sensor 32, a first voltage regulating circuit 33, a second voltage regulating circuit 34 and a switch control circuit 35. In particular, the first sensor 31 is coupled with the first terminal of the first capacitor C1 to monitor the first voltage V+, and the second sensor 32 is coupled with the first terminal of the second capacitor C2 to monitor the second voltage V−. The first voltage regulating circuit 33 is coupled with the first sensor 31 to compare the first voltage V+ with a first reference voltage VREF1, and the second voltage regulating circuit 34 is coupled with the second sensor 32 to compare the second voltage V− with a second reference voltage VREF2. The switch control circuit 35 is coupled with the first voltage regulating circuit 33 and the second voltage regulating circuit 34, and controls the ON/OFF of the first switch SW1, the second switch SW2, the third switch SW3, the fourth switch SW4, the fifth switch SW5 and the sixth switch SW6 according to the comparison made by the voltage regulating circuits.

Figure 3A:
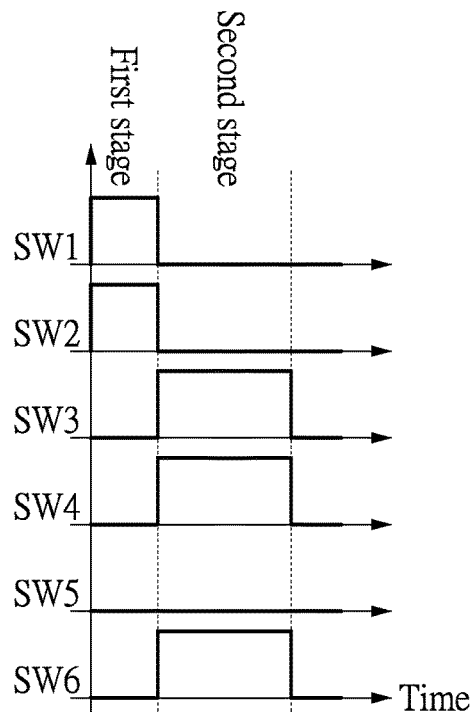
FIG. 3A shows a schematic diagram of the settings of switches in the dual voltage output device according a first embodiment of the present disclosure.
Figure 3B:
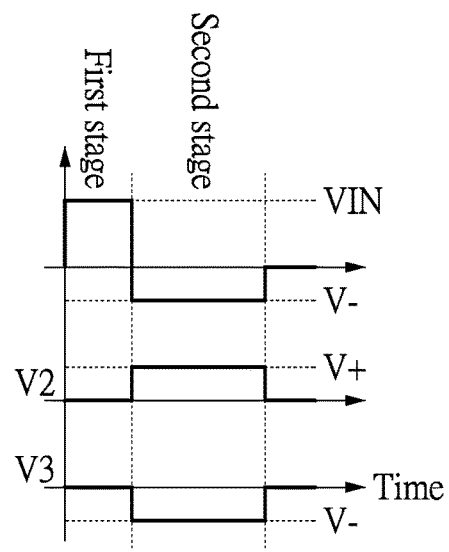
FIG. 3B shows a schematic diagram of the waveforms of voltage according to the dual voltage output device in FIG. 3A.

Reference is made to FIGS. 1 and 3A, which are schematic diagrams of the settings of switches according a first embodiment of the present disclosure. In a first stage of the embodiment, the control circuit 3 turns on the first switch SW1 and second switch SW2, and turns off the third switch SW3, fourth switch SW4, fifth switch SW5 and sixth switch SW6. Therefore, the DC voltage source VIN, the first switch SW1, the inductor L, the second switch SW2 and the ground GND together form a loop so that the DC voltage source VIN charges the inductor L. The first capacitor C1 provides a first voltage V+ to the first load circuit and the second capacitor C2 provides a second voltage V− to the second load circuit. Next, the first voltage V+ is lower than the first reference voltage VREF1 (e.g., 5V), and the second voltage V− is higher than the second reference voltage VREF2 (e.g., −5V). That is, both the first voltage V+ and the second voltage V− are undervoltage. In this case (which is a second stage of the embodiment), the control circuit 3 turns off the first switch SW1, the second switch SW2 and the fifth switch SW5, and turns on the third switch SW3, the fourth switch SW4 and the sixth switch SW6 in a second stage. Therefore, the ground GND, the second capacitor C2, the sixth switch SW6, the fourth switch SW4, the inductor L, the third switch SW3, the first capacitor C1 and the ground GND together form a loop. At this time, the inductor L charges the first capacitor C1 and the second capacitor C2. In the present embodiment, the first reference voltage VREF1 and the second reference voltage VREF2 are 5V and −5V respectively, but the present disclosure is not limited thereto. A person having ordinary skill in the art may modify the first reference voltage VREF1 and the second reference voltage VREF2 to fit particular needs. FIG. 3B shows a schematic diagram of the waveforms of voltage according to the dual voltage output device in FIG. 3A.

Figure 4A:
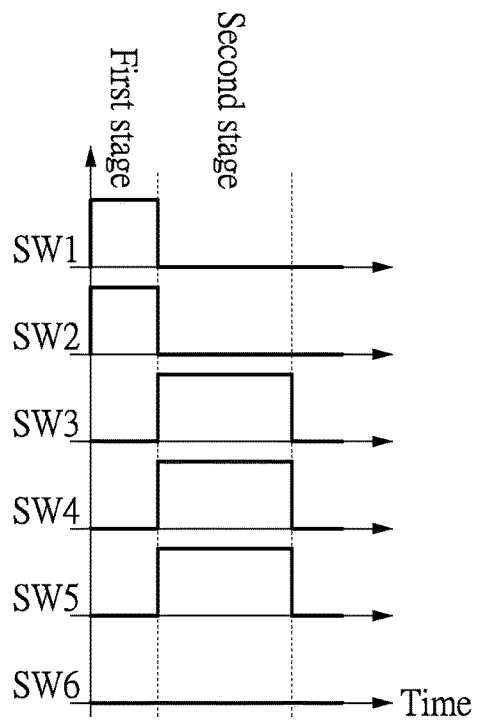
FIG. 4A shows a schematic diagram of the settings of switches in the dual voltage output device according a second embodiment of the present disclosure.
Figure 4B:
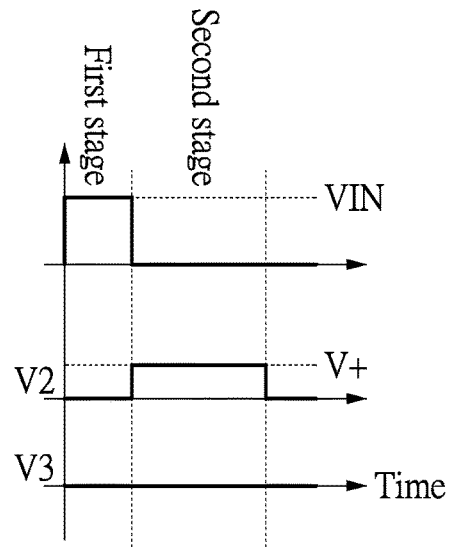
FIG. 4B shows a schematic diagram of the waveforms of voltage according to the dual voltage output device in FIG. 4A.

Reference is next made to FIGS. 1 and 4A, which are schematic diagrams of the settings of switches according a second embodiment of the present disclosure. The first stage in the second embodiment is similar to that of the first embodiment, and is not reiterated herein. The first capacitor C1 provides a first voltage V+ to the first load circuit and the second capacitor C2 provides a second voltage V− to the second load circuit. In this embodiment, the first voltage V+ is lower than the first reference voltage VREF1 (e.g., 5V), but the second voltage V− is not higher than the second reference voltage VREF2 (e.g., −5V). That is, only the first voltage V+ is undervoltage. In this case, the control circuit 3 turns off the first switch SW1, the second switch SW2 and the sixth switch SW6, and turns on the third switch SW3, fourth switch SW4 and fifth switch SW5 in the second stage. At this time, the ground GND, the fifth switch SW5, the fourth switch SW4, the inductor L, the third switch SW3, the first capacitor C1 and the ground GND together form a loop so that the inductor L charges only the first capacitor C1. FIG. 4B shows a schematic diagram of the waveforms of voltage of a first terminal V1, a second terminal V2 and a third terminal V3 in the first stage (i.e., the DC voltage source VIN charges the inductor L) and the second stage (i.e., the inductor L charges the first capacitor C1).

Figure 5A:
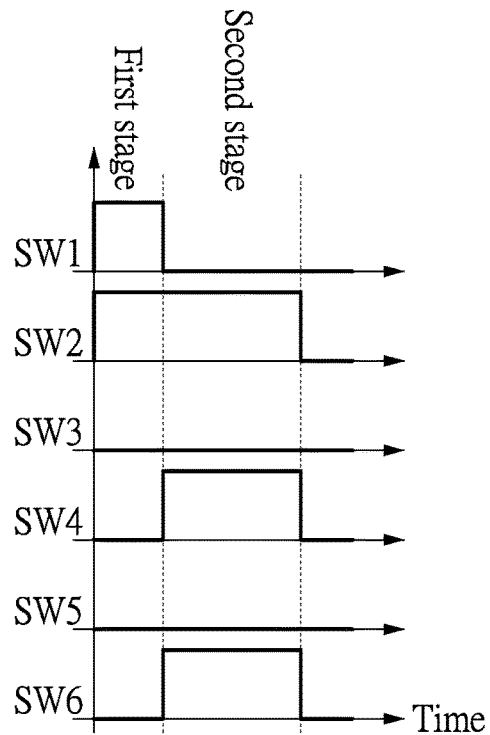
FIG. 5A shows a schematic diagram of the settings of switches in the dual voltage output device according a third embodiment of the present disclosure.
Figure 5B:
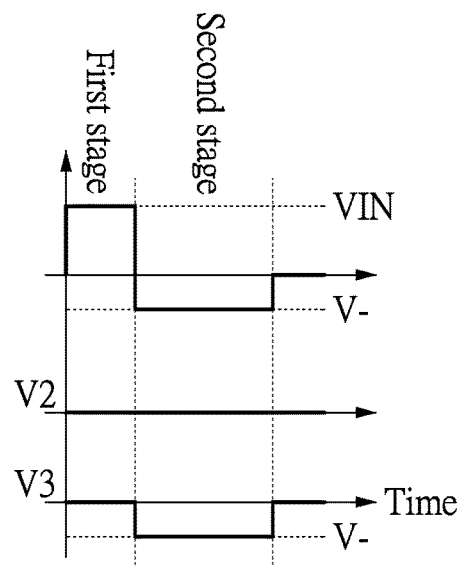
FIG. 5B shows a schematic diagram of the waveforms of voltage according to the dual voltage output device in FIG. 5A.

Reference is next made to FIGS. 1 and 5A, which are schematic diagrams of the settings of switches according a third embodiment of the present disclosure. The first stage in the third embodiment is similar to that of the first and second embodiments, and is not reiterated herein. The first capacitor C1 provides a first voltage V+ to the first load circuit and the second capacitor C2 provides a second voltage V− to the second load circuit. In this embodiment, the first voltage V+ is not lower than the first reference voltage VREF1 (e.g., 5V), but the second voltage V− is higher than the second reference voltage VREF2 (e.g., −5V). That is, only the second voltage V− is undervoltage. In this case, the control circuit 3 turns off the first switch SW1, the third switch SW3 and the fifth switch SW5, and turns on the second switch SW2, the fourth switch SW4 and the sixth switch SW6 in the second stage. At this time, the ground GND, the second capacitor C2, the sixth switch SW6, the fourth switch SW4, the inductor L, the second switch SW2 and the ground GND together form a loop so that the inductor L charges only the second capacitor C2. FIG. 5B shows a schematic diagram of the waveforms of voltage of the first terminal V1, the second terminal V2 and the third terminal in the first stage (i.e., the DC voltage source VIN charges the inductor L) and the second stage (i.e., the inductor L charges the second capacitor C2).

In summary, the dual voltage output device 1 repeats the first and the second stages by the control circuit 3, which controls the ON/OFF of the first switch SW1, the second switch SW2, the third switch SW3, the fourth switch SW4, the fifth switch SW5 and the sixth switch SW6. Therefore, the DC voltage source VIN charges the inductor L, and the inductor L charges the first capacitor C1 and the second capacitor C2 individually or together. In this regard, the dual voltage output device 1 can maintain the first voltage V+ from the first capacitor C1 at the first reference voltage VREF1, and the second voltage V− from the second capacitor C2 at the second reference voltage VREF2. Therefore, the dual voltage output device 1 in the present disclosure stabilizes the output voltages for the first load circuit (positive) and the second load circuit (negative) respectively.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present invention delineated by the following claims.

What is claimed is:

1. A charging circuit, comprising:
   a first switch having a first terminal coupled with a DC voltage source;
   an inductor having a first terminal coupled with a second terminal of the first switch;
   a second switch having a first terminal coupled with a second terminal of the inductor, and a second terminal coupled to the ground;
   a third switch having a first terminal coupled with the second terminal of the inductor;
   a first capacitor for providing a first voltage, the first capacitor having a first terminal coupled with a second terminal of the third switch, and a second terminal coupled to the ground;
   a fourth switch having a first terminal coupled with the second terminal of the first switch;
   a fifth switch having a first terminal coupled with a second terminal of the fourth switch, and a second terminal coupled to the ground;
   a sixth switch having a first terminal coupled with the second terminal of the fourth switch; and
   a second capacitor for providing a second voltage, the second capacitor having a first terminal coupled with a second terminal of the sixth switch, and a second terminal coupled to the ground;
   wherein the DC voltage source charges the inductor when the first switch and the second switch are turned on and the third switch, the fourth switch, the fifth switch and the sixth switch are turned off.

2. The charging circuit according to claim 1, wherein the inductor charges the first capacitor and second capacitor when the first switch, the second switch and the fifth switch are turned off, and the third switch, the fourth switch and the sixth switch are turned on.

3. The charging circuit according to claim 1, wherein the inductor charges the first capacitor when the first switch, the second switch and the sixth switch are turned off, and the third switch, the fourth switch and the fifth switch are turned on.

4. The charging circuit according to claim 1, wherein the inductor charges the second capacitor when the first switch, the third switch and the fifth switch are turned off, and the second switch, the fourth switch and the sixth switch are turned on.

5. A dual voltage output device, comprising:
   a charging circuit, including:
      a first switch having a first terminal coupled with a DC voltage source;
      an inductor having a first terminal coupled with a second terminal of the first switch;
      a second switch having a first terminal coupled with a second terminal of the inductor, and a second terminal coupled to the ground;
      a third switch having a first terminal coupled with the second terminal of the inductor;
      a first capacitor for providing a first voltage, the first capacitor having a first terminal coupled with a second terminal of the third switch, and a second terminal coupled to the ground;
      a fourth switch having a first terminal coupled with the second terminal of the first switch;
      a fifth switch having a first terminal coupled with a second terminal of the fourth switch, and a second terminal coupled to the ground;
      a sixth switch having a first terminal coupled with the second terminal of the fourth switch; and
      a second capacitor for providing a second voltage, the second capacitor having a first terminal coupled with a second terminal of the sixth switch, and a second terminal coupled to the ground; and
   a control circuit coupled with the charging circuit for controlling the first switch, the second switch, the third switch, the fourth switch, the fifth switch and the sixth switch.

6. The dual voltage output device according to claim 5, wherein the DC voltage source charges the inductor when the first switch and the second switch are turned on, and the third switch, the fourth switch, the fifth switch and the sixth switch are turned off.

7. The dual voltage output device according to claim 6, wherein the inductor charges the first capacitor and the second capacitor when the first switch, the second switch and the fifth switch are turned off, and the third switch, the fourth switch and the sixth switch are turned on.

8. The dual voltage output device according to claim 6, wherein the inductor charges the first capacitor when the first switch, the second switch and the sixth switch are turned off, and the third switch, the fourth switch and the fifth switch are turned on.

9. The dual voltage output device according to claim 6, wherein the inductor charges the second capacitor when the first switch, the third switch and the fifth switch are turned off, and the second switch, the fourth switch and the sixth switch are turned on.

* * * * *